(12) United States Patent
Faragher

(10) Patent No.: US 8,963,775 B2
(45) Date of Patent: Feb. 24, 2015

(54) TRACKING RADIO SIGNAL SOURCES

(75) Inventor: Ramsey Michael Faragher, Huyton (GB)

(73) Assignee: BAE Systems PLC, London (GB)

( * ) Notice: Subject to any disclaimer, the term of this patent is extended or adjusted under 35 U.S.C. 154(b) by 415 days.

(21) Appl. No.: 13/500,015

(22) PCT Filed: Oct. 4, 2010

(86) PCT No.: PCT/GB2010/051655
§ 371 (c)(1),
(2), (4) Date: Apr. 3, 2012

(87) PCT Pub. No.: WO2011/042727
PCT Pub. Date: Apr. 14, 2011

(65) Prior Publication Data
US 2012/0194387 A1  Aug. 2, 2012

(30) Foreign Application Priority Data

| Oct. 5, 2009 | (EP) | 09275091 |
| Oct. 5, 2009 | (EP) | 09275092 |
| Oct. 5, 2009 | (GB) | 0917384.0 |
| Oct. 5, 2009 | (GB) | 0917388.1 |
| Nov. 27, 2009 | (EP) | 09177349 |
| Nov. 27, 2009 | (GB) | 0920772.1 |
| Jun. 7, 2010 | (EP) | 10275059 |
| Jun. 7, 2010 | (GB) | 1009486.0 |
| Aug. 10, 2010 | (GB) | 1013413.8 |

(51) Int. Cl.
*G01S 3/02* (2006.01)
*G01S 1/24* (2006.01)
(Continued)

(52) U.S. Cl.
CPC .... *G01S 5/10* (2013.01); *G01S 5/02* (2013.01)
USPC ............................ 342/451; 342/387; 342/463

(58) Field of Classification Search
CPC ........... G01S 5/02; G01S 5/06; H04W 64/003
USPC ............ 342/357.21, 386, 387, 451, 463–465;
455/456.1, 456.6; 701/468, 469
See application file for complete search history.

(56) References Cited

U.S. PATENT DOCUMENTS

| 4,024,383 A | 5/1977 | Beasley |
| 5,045,861 A | 9/1991 | Duffett-Smith |

(Continued)

FOREIGN PATENT DOCUMENTS

| DE | 101 11 967 A1 | 10/2001 |
| DE | 10111967 A1 | 10/2001 |

(Continued)

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in the corresponding International Application No. PCT/GB2010/051655. (11 pages).

(Continued)

*Primary Examiner* — Dao Phan
(74) *Attorney, Agent, or Firm* — Maine Cernota & Rardin

(57) ABSTRACT

A method and system of determining the position of a radio signal transmitter are described. The method includes determining the type of radio signal being transmitted from the radio signal transmitter by analysing radio signal characteristics and correlating different sets of information to determine the position of the radio signal transmitter. Each set of information corresponds to a different relative position of at least one receiver to the transmitter and includes radio signal data derived from radio signals received by the at least one receiver from the transmitter at each respective relative position and positioning data containing information about the position of the at least one receiver at each respective relative position.

16 Claims, 10 Drawing Sheets

(51) Int. Cl.
*G01S 5/10* (2006.01)
*G01S 5/02* (2010.01)

(56) References Cited

U.S. PATENT DOCUMENTS

| | | | |
|---|---|---|---|
| 5,502,450 | A | 3/1996 | Zablotney et al. |
| 6,100,845 | A | 8/2000 | Rose |
| 6,445,927 | B1 | 9/2002 | King et al. |
| 6,567,669 | B1 | 5/2003 | Groome |
| 6,868,073 | B1 | 3/2005 | Carrender |
| 6,876,325 | B1 | 4/2005 | Coluzzi et al. |
| 7,228,139 | B1 | 6/2007 | Wortham |
| 7,388,541 | B1 | 6/2008 | Yang |
| 7,468,694 | B2 | 12/2008 | Shoarinejad |
| 7,471,241 | B1 | 12/2008 | Yang |
| 8,169,365 | B2 | 5/2012 | Shoarinejad |
| 8,442,557 | B2 | 5/2013 | Aggarwal et al. |
| 2001/0022558 | A1 | 9/2001 | Karr et al. |
| 2002/0126046 | A1 | 9/2002 | Counselman, III et al. |
| 2003/0022675 | A1 | 1/2003 | Mergler |
| 2003/0048731 | A1 | 3/2003 | Ozaki et al. |
| 2003/0125046 | A1 | 7/2003 | Riley et al. |
| 2003/0125875 | A1 | 7/2003 | Lee |
| 2003/0176196 | A1 | 9/2003 | Hall et al. |
| 2003/0222820 | A1 | 12/2003 | Karr et al. |
| 2004/0102198 | A1 | 5/2004 | Diener et al. |
| 2004/0242234 | A1 | 12/2004 | Klenner |
| 2005/0156782 | A1 | 7/2005 | Whelan et al. |
| 2005/0184907 | A1 | 8/2005 | Hall et al. |
| 2005/0197769 | A1 | 9/2005 | Soehren et al. |
| 2005/0288033 | A1 | 12/2005 | McNew et al. |
| 2006/0181454 | A1 | 8/2006 | Nichols |
| 2006/0211430 | A1 | 9/2006 | Persico |
| 2007/0247361 | A1 | 10/2007 | Shoarinejad |
| 2008/0032706 | A1 | 2/2008 | Sheynblat et al. |
| 2008/0113672 | A1 | 5/2008 | Karr et al. |
| 2008/0167049 | A1 | 7/2008 | Karr et al. |
| 2008/0234930 | A1 | 9/2008 | Cheok et al. |
| 2008/0242310 | A1 | 10/2008 | Vassilovski |
| 2009/0096667 | A1 | 4/2009 | Shoarinejad |
| 2009/0115658 | A1 | 5/2009 | Zimmerman et al. |
| 2009/0156229 | A1 | 6/2009 | Hein et al. |
| 2009/0181695 | A1 | 7/2009 | Wirola et al. |
| 2010/0178934 | A1 | 7/2010 | Moeglein et al. |
| 2010/0234071 | A1 | 9/2010 | Shabtay et al. |
| 2010/0268462 | A1 | 10/2010 | Tebbit et al. |
| 2010/0309057 | A1 | 12/2010 | Edge et al. |
| 2011/0128183 | A1 | 6/2011 | Marshall |
| 2011/0183626 | A1 | 7/2011 | Das et al. |
| 2011/0312320 | A1 | 12/2011 | Moeglein et al. |
| 2012/0172055 | A1 | 7/2012 | Edge |
| 2012/0176491 | A1 | 7/2012 | Garin et al. |
| 2012/0176525 | A1 | 7/2012 | Garin et al. |
| 2012/0194387 | A1 | 8/2012 | Faragher |
| 2012/0194389 | A1 | 8/2012 | Faragher |
| 2012/0196622 | A1 | 8/2012 | Faragher |

FOREIGN PATENT DOCUMENTS

| | | |
|---|---|---|
| EP | 0 303 371 A1 | 2/1989 |
| EP | 0 437 822 A2 | 7/1991 |
| EP | 1 271 178 A2 | 1/2003 |
| EP | 1 361 773 A1 | 11/2003 |
| EP | 1 942 351 | 7/2008 |
| GB | 1 013 413 | 12/1965 |
| GB | 2 254 508 A | 10/1992 |
| GB | 2 359 699 A | 8/2001 |
| GB | 2 380 793 A | 4/2003 |
| JP | 58-200179 A | 11/1983 |
| JP | 2009-300146 A | 12/2009 |
| WO | WO 02/09107 A2 | 1/2002 |
| WO | WO 02/23215 A1 | 3/2002 |
| WO | WO 02/33435 A2 | 4/2002 |
| WO | WO 02/069507 A2 | 9/2002 |
| WO | WO 03/008990 A2 | 1/2003 |
| WO | WO 03/010552 A2 | 2/2003 |
| WO | WO 03/058985 A2 | 7/2003 |
| WO | WO 2004/074779 A1 | 9/2004 |
| WO | WO 2006/099632 A2 | 9/2006 |
| WO | WO 2007/001660 A2 | 1/2007 |
| WO | WO 2008/116168 A1 | 9/2008 |
| WO | WO 2008/118621 A1 | 10/2008 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051657. (10 pages).

Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051653. (10 pages).

Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051654. (11 pages).

Particle Filter from Wikipedia, XP-002628464, Aug. 23, 2005, pp. 1-3.

International Search Report (PCT/ISA/210) issued on Feb. 1, 2011, by British Patent Office as the International Searching Authority for International Application No. PCT/GB2010/051657.

International Search Report (PCT/ISA/210) issued on Jul. 7, 2011, by British Patent Office as the International Searching Authority for International Application No. PCT/GB2010/051653.

International Search Report (PCT/ISA/210) issued on Oct. 19, 2011, by British Patent Office as the International Searching Authority for International Application No. PCT/GB2010/051655.

International Search Report (PCT/ISA/210) issued on Mar. 22, 2011, by British Patent Office as the International Searching Authority for International Application No. PCT/GB2010/051654.

Search Report issued on Mar. 15, 2010, by European Patent Office for Application No. 09275091.8.

Search Report issued on Feb. 5, 2010, by British Patent Office for Application No. 0917384.0.

Search Report issued on Mar. 8, 2010, by British Patent Office for Application No. 0917388.1.

Search Report issued on Apr. 26, 2010, by European Patent Office for Application No. 09275092.6.

Search Report issued on Dec. 17, 2010, by British Patent Office for Application No. 1013413.8.

Search Report issued on Oct. 7, 2010, by British Patent Office for Application No. 1009486.0.

Search Report issued on Feb. 23, 2011, by European Patent Office for Application No. 10275059.3.

Search Report issued on Mar. 24, 2010, by British Patent Office for Application No. 0920772.1.

Search Report issued on Jun. 8, 2010, by European Patent Office for Application No. 09177349.9.

Written Opinion isssued on Jul. 7, 2011, by European Patent Office for Application No. PCT/GB210/051653.

Yang, C., Nguyen, T., "Self-Calibrating Position Location Using Signals of Opportunity," Proceedings of the 22nd International Technical Meeting of the Satellite Division of the Institute of Navigation (ION GNSS 2009), Savannah, GA, Sep. 2009, pp. 1055-1063.

Webb, Toby A. et al., "A New Differential Positioning Method Using Modulation Correlation of Signals of Opportunity", Position Location and Navigation Symposium (PLANS), 2010 IEEE/ION, IEEE, Piscataway, NJ, USA, May 4, 2010, pp. 972-981, XP031707045, ISBN: 978-1-4244-5036-7.

International Search Report issued on Feb. 18, 2011, by British Patent Office as the International Searching Authority for International Application No. PCT/GB2010/051656.

Australian Patent Examination Report No. 1 for Application No. 2010304861, dated Oct. 28, 2013.

TRACKING RADIO SIGNAL SOURCES

FIELD OF THE INVENTION

The present invention relates to a method and system for tracking the position of one or more radio signal transmitters. In particular, the method and system allows the improved tracking of the position of radio signal transmitters that are of unknown types and at least initially are at unknown locations.

BACKGROUND TO THE INVENTION

There are many ways of determining the position of an unknown radio transmission transmitter/source. Assuming that the radio transmission source is stationary, then methods well known in the art such as radio triangulation and multi-lateration can be used to determine the position of a radio transmission source.

Typically, a radio signal receiver, or a cooperating group of radio signal receivers can be positioned at different positions relative to an unknown radio signal transmitter and pick up radio signal data from it. The different sets of data can then be correlated with one another to infer the position of the unknown radio signal source. Radio signal data from transmitters such as cellular telephone base stations, television, public radio transmitters and the like comprise distinguishing radio signal characteristics—such as code words—that can be used in such data correlation.

The collected and correlated radio signal data can then be used to provide feedback to a user about the location of the radio signal transmitter. For example, this may be achieved via an electronic display showing an icon overlaid onto a map, the icon representing the position of the radio signal transmitter/source.

Whilst, in theory, only a single set of radio signal data is needed to derive a single solution for the position of the radio signal source, in practice many sets of data are required to determine the position of the radio signal source to a degree of certainty—for example, to compensate for multi-path signal errors.

After collecting many sets of data, a so-called "error ellipse" can be drawn which shows the precision of the position estimate.

For example, with reference to FIG. 11, after taking six readings, six estimates A, B, C, D, E, and F of the position of a radio transmission source are obtained. As these reading are not the same as one another, a first error ellipse ee1 is defined, representing the error on the position of the radio transmission source.

During the course of taking a number of readings, a spurious reading may be received. For example, this is represented in FIG. 11 as position estimate G which returns a position significantly spaced from the six previous position estimates A, B, C, D, E, and F.

One way of dealing with such a reading G is to simply incorporate it into the existing set of readings—and increase the size of the error ellipse—thereby creating a second bigger error ellipse ee2. However, doing this may be inappropriate and could incorrectly increase the error ellipse and/or incorrectly skew the position estimate average. Therefore, when calculating the position of a radio signal transmitter, such erroneous readings tend to be ignored so as to collapse the error ellipse and get a more precise determination of the position of the radio signal transmitter.

However, it is not necessarily correct to ignore a reading that results in a significantly different location of a radio signal transmitter from a previous set. It may be appropriate, in some cases, to take it into consideration especially if that radio signal transmitter is mobile. How such a reading is treated depends on the way the radio signal data is correlated.

Therefore, one problem is determining how best to localise the position of a radio signal source of an unknown type—in particular for which the mobility is unknown. If a radio signal source is assumed to be stationary, but in fact is mobile, then readings of the position of the radio signal source may be incorrectly discarded as erroneous until a sufficient number of readings have been received to feedback a correctly updated position to a user. This could lead to a lag between the radio signal source having actually moved, and the same being represented by the navigation system. If the radio signal source is assumed to be mobile, but in fact it is stationary, this generally leads to the represented position of the radio signal source erroneously fluctuating making it difficult to pinpoint, and also incorrectly returning a larger error ellipse than appropriate.

Radio source mobility is not the only factor affecting localisation. For example, the quality of a radio transmission source can also be influential in localising that source. Clock drift on transmitters can vary significantly. Transmitters with stable oscillators (e.g. cellular transmitters) produce more reliable radio signal sources from which to localise—and so will tend to have a smaller error ellipse—than those with relatively unstable oscillators (e.g. low-grade walkie-talkies). Therefore, the amount of time needed to localise a low quality radio transmission source will be greater, and the error ellipse will be larger than for that of a high quality radio transmission source. However, if the quality of the radio source is not known, then a localisation system may expend too many resources, or take a disproportionate amount of time in processing the radio signal data. For example, it may take too long to be assured of the position of a high quality radio source and it may also take too long in attempting to resolve the exact position of a low quality radio source (when in fact only a rough estimate is possible).

It is an object of the present invention to alleviate the above-mentioned problems.

DISCLOSURE OF THE INVENTION

According to a first aspect of the present invention there is provided a method of determining the position of a radio signal transmitter comprising;

determining the type of radio signal being transmitted from the radio signal transmitter by analysing the radio signal for radio signal characteristics; and correlating different sets of information in a way dependent on the determined radio signal type in order to determine the position of the radio signal transmitter;

wherein each set of information corresponds to a different relative position of at least one receiver to the transmitter, each set of information comprising:

radio signal data derived from radio signals received by the at least one receiver from the transmitter at each respective relative position; and positioning data containing information about the position of the at least one receiver at each respective relative position.

Preferably, the method further comprises assessing the dynamics of a platform on which the radio signal transmitter is supported, and correlating the different sets of information in a way dependent on the determined dynamics of the platform.

Advantageously, by correlating the different sets of information in dependence on the type of radio signal being transmitted, a better method of correlation can be applied to more accurately and/or more quickly determine the position of a radio signal transmitter/source. It will be understood that this is particularly advantageous for unknown radio signal sources that have not been previously encountered, and especially for which the mobility is unknown.

Preferably, determining the type of radio signal being transmitted from the radio signal transmitter comprises determining whether the type of radio signal originates from a mobile (i.e. movable or moving) radio signal source or a stationary radio signal source. If the type of radio signal originates from a mobile radio signal source the correlating different sets of information step may be repeated in order to track the mobile radio signal source. Tracking, in this context, is to be understood as determining the position repeatedly over time.

It will be understood that a number of different sets of information are needed to provide sufficient information to localise the radio signal transmitter. Each of these sets of information may be collected by a single receiver (for example, picking up radio signal data at a number of relative locations in turn) or may be collected from multiple receivers which are distributed and so can simultaneously gather radio signal data. It is preferable for the radio signal data to be derived from radio signals received at a plurality of receivers as this can advantageously facilitate tracking of a mobile radio signal transmitter. To this end, it is preferable for the receivers to be arranged to be in communication with one another so that they can share different sets of information. Therefore where there are a plurality of receivers, they may be arranged to be in communication with one another so that they can share the different sets of information.

Preferably, at least one of the sets of information comprises radio signal time of flight values/ranges.

Preferably, at least one of the sets of information comprises radio signal strength.

Preferably, at least one of the sets of information comprises radio signal arrival angle. Radio signal arrival angle may be defined in terms of a bearing value/range, for example of a transmitter relative to a receiver.

It will be understood that tracking of a mobile radio signal transmitter using a single receiver is possible, but may involve the use of resources such as a directional array that do not necessarily need to be employed in the case of multiple distributed receivers.

The method of determining/tracking the position of a radio signal transmitter may comprise querying a database to determine how to correlate the different sets of information. The database may comprise a set of rules and/or assumptions mapping different sets of radio signal characteristics to different ways of correlating.

Preferably, the method of determining/tracking comprises updating the database with additional rules and/or assumptions. Preferably, updating the database comprises downloading additional rules and/or assumptions. Preferably, updating the database comprises receiving user input.

Preferably, the method of determining/tracking comprises presenting a user interface to receive user input, for example about the radio signal transmitter. User input may comprise information about at least one of a) mobility of the radio signal transmitter (e.g. comprising values/ranges for speed, acceleration, and other dynamics of the radio signal transmitter), b) a bearing value/range of the radio signal transmitter relative to a given receiver, c) estimated position value/range, and d) estimated type.

Preferably, the method of determining/tracking comprises presenting a user interface to display information about the radio signal transmitter. The displayed information may comprise a map on which a representation of the radio signal transmitter may be imposed. The representation may comprise an icon. The choice of icon may be user-selectable. The representation may comprise an error ellipse, the size and shape of which can be representative of the error associated with estimated position of the radio transmitter.

Preferably, correlating data comprises applying a Bayesian estimation filter. Preferably, application of the Bayesian estimation filter comprises loading the filter with a model associated with the determined type of radio signal transmitter, for example, an error model associated with the drift associated with a radio signal transmitter clock.

Preferably, the error model is chosen from the database in response to determined radio signal type.

Preferably, the Bayesian estimation filter comprises a Kalman filter or a particle filter.

Preferably, the method comprises maintaining multiple instances of differently correlated information sets in parallel and then choosing the instance resulting in the most likely position of the transmitter.

Preferably, the method comprises receiving radio signals of different types, for example, television, cellular, wi-fi and public radio signals.

Preferably, analysing the signal for radio signal characteristics comprises searching the radio signal for code words repeated at a regular interval.

According to a second aspect of the present invention there is provided a navigation system for determining the position of a radio signal transmitter comprising;

determining means arranged to determine the type of radio signal being transmitted from the radio signal transmitter by analysing the radio signal for radio signal characteristics; and correlating mean arranged to correlate different sets of information in a way dependent on the determined radio signal type in order to determine the position of the radio signal transmitter;

wherein each set of information corresponds to a different relative position of at least one receiver to the transmitter, each set of information comprising:

radio signal data derived from radio signals received by the at least one receiver from the transmitter at each respective relative position; and positioning data containing information about the position of the at least one receiver at each respective relative position.

According to a third aspect of the present invention there is provided a method of estimating the position of a radio signal receiver comprising;

estimating the position of a first stationary radio signal transmitter using a primary set of positioning resources available to the receiver;

adding the position of the first transmitter to a secondary set of positioning resources available to the receiver; and using the secondary set of positioning resources to estimate the position of the receiver.

Advantageously, the method can maximise the speed, reliability and accuracy of estimating the position of a receiver over and above that possible using the original (primary) set of positioning resources. This is achieved by being receptive to signals from a first transmitter that has an unknown or uncertain position—and therefore is not part of the primary set of positioning resources, determining the position of that transmitter—thereby turning it into a usable positioning resource, and adding it to a secondary set of positioning resources. (The secondary set of positioning resources may comprise the primary set of positioning resources plus the newly added first transmitter).

The transmitter, newly added as a positioning resource can thus act to complement the existing set of positioning resources to better aid the estimation of the position of the receiver. This method is particularly advantageous if the receiver is moving through an environment in which its original set of positioning resources are rendered unusable, as this method can allow navigation solely on the basis of a newly acquired set of positioning resources, separate from the original set. That is to say, the secondary set of positioning resources may be used to estimate the position of the receiver when the primary set of positioning resources is ineffectual.

For example, if the primary set of positioning resources consists of a GPS system, and the receiver enters into an area, for example under dense foliage, where the number of GPS satellites signals received alone is not sufficient for accurate localisation, using a newly acquired positioning resource in the form of the first transmitter can augment what little information is received from the GPS satellites to allow otherwise impossible, or at least unreliable localisation.

In addition to this, the secondary set of positioning resources may be used to complement the primary set of positioning resources to allow the localisation provided by the primary set of positioning resources to be enhanced. For example, the position of the receiver may be determined to a greater degree of accuracy, and/or the rate at which the position of the receiver is determined can be increased (which is particularly useful if the receiver is moving quickly).

A further advantage is that the estimation of the location of the receiver can be achieved passively—i.e. without two-way communication. This can reduce the technical complexity of the receiver as it is not required to transmit information—only receive. In addition, this arrangement increases the versatility of the system as a whole—in particular promoting the mobility of the receiver. Passive localisation is also an important consideration in certain applications where the transmission of signals from the receiver is undesirable—for example, because of signal interference with other devices attempting to self localise, or if it is desirable for the receiver to remain undetectable.

Preferably, estimating the position of the first transmitter using a primary set of positioning resources comprises correlating different sets of information, each set of information corresponding to a different relative position of the receiver to the first transmitter.

Preferably, each set of information comprises;

radio signal data derived from radio signals received by the receiver from the first transmitter at each respective relative position; and positioning data derived from the primary set of positioning resources containing information about the position of the receiver at each respective relative position.

Each set of information may comprise radio signal data obtained from the primary set of positioning resources. The primary set of positioning resources may comprise a reference receiver separate from, but in communication with the receiver.

Preferably, radio signal data comprises the radio signal time of flight.

Preferably, the radio signal time of flight is determined by calculating the clock bias between the radio signal receiver and the radio signal transmitter.

Preferably, each set of information comprises values for one or more parameters in the equation:

$$ct_{i,j} = |r_i - b_j| + \epsilon_i - \alpha_j$$

where:

c is the known speed of the radio waves;

$t_{i,j}$ represents the arrival time of the transmission from the $j^{th}$ transmitter at the $i^{th}$ receiver location;

the vectors $r_i$ and $b_j$ are positions of the $i^{th}$ receiver location and $j^{th}$ transmitter respectively (these may be two-dimensional or three-dimensional as required);

$\epsilon_i$ represents the combined initial clock bias and subsequent clock drift of the receiver, and;

$\alpha_j$ represents the combined initial clock bias and subsequent clock drift of a given transmitter.

Advantageously, additional sets of information can be collected and correlated to refine the estimated position of the transmitter. Generally, during estimation of the position of the first transmitter, multiple sets of information are gathered—a different set for each different relative position of the receiver and transmitter. The different sets can then be correlated with one another to improve the estimate of the position of the transmitter. As the number of sets of information increase, the accuracy of the estimated position of the transmitter also increases.

Preferably, input data correlation comprises applying a Bayesian estimation filter.

The Bayesian estimation filter may comprise a Kalman-based filter or a particle filter.

Advantageously, the Kalman filter is the optimum filter for linear systems with Gaussian noise, while particle filters can be suitably tuned to account for non-linearity and non-Gaussian noise sources. Extensions to the Kalman filter, such as the Extended Kalman Filter and the Unscented Kalman Filter provide better performance for non-linear systems. Alternatively a recursive Bayesian Estimator may be derived for the system.

Preferably, the application of a Bayesian estimation filter comprises loading the filter with error models associated with the transmitter and/or receiver clocks.

Preferably, the application of a Bayesian estimation filter comprises loading the filter with information from an inertial measurement unit about the movement of the receiver relative to the transmitter.

Preferably, estimating the position of the first transmitter using a primary set of positioning resources comprises maintaining multiple instances of differently correlated information sets in parallel and then choosing the instance resulting in the most likely position of the transmitter.

Preferably the position estimates will be determined using a Simultaneous Localisation and Mapping (SLAM) framework, allowing correlations between the estimates of the locations of the transmitters and receiver to be strongly maintained.

It will be understood that there are a number of different ways of correlating data, for example using different processing algorithms, or by correlating a set of data in different sequences. Depending on the algorithm used, the output of the algorithm will either diverge or converge towards a single answer (i.e. the estimated position for transmitter will become refined). However, convergence towards a single answer may not necessarily be immediate, and so it is advantageous to maintain parallel instances of differently correlated information sets. Thus, as additional radio signal data and/or positioning data is obtained, the option can be reserved of using the algorithm that results in the best estimated position.

Preferably, the first set of positioning resources comprises a global satellite navigation system and/or an inertial measurement unit.

Advantageously, different positioning resources can be used to complement one another.

Preferably, the receiver is arranged to receive radio signals of different types, for example, television, cellular, wi-fi and public radio signals.

Advantageously, this can improve the chance of estimating the position of the receiver as this maximises the signals of opportunity from which receiver can determine its location, as part of the secondary set of positioning resources.

Preferably, the receiver is arranged to determine the type of the radio signal being transmitted from the first transmitter by analysing the signal for radio signal characteristics.

Radio signal characteristics may include frequency, bandwidth, the modulation scheme, the interleaving scheme, the repeated code word, and/or the repeat rate of the code word. These are generally publically available, and can be pre-stored in a database for reference by a navigation system on picking up an unknown radio signal for use in correlating different sets of information. However, in the case that the radio signal characteristics are not known, the navigation system may be advantageously arranged to work out such characteristics by analysing the radio signal. This can be achieved whilst the radio signal receiver is stationary. During this time, the received radio signal data can be analysed to spot regularly repeating patterns (e.g. code words) and the repeat rate of these code words. Whilst this can take longer than simply looking up the code words and repeat rates in a database, this makes the system more flexible and amenable to receiving and effectively utilising radio signals that are not specified in the database.

Preferably, the radio signals used for radio-localisation are time-based, using code words.

Preferably, the method comprises estimating the position of further transmitters, and adding their positions to the secondary set of positioning resources.

Advantageously, having a plurality of transmitters added to the secondary set of positioning resources can further improve the speed, accuracy and reliability of the estimation of the position of the receiver. For example, the original set of positioning resources can become redundant in favour of the newly established group of transmitters as positioning resources, which may serve as better positioning resources—for example, due to increased resolution, better signal characteristics (e.g. allowing an increased update speed of localisation) and/or because of being more optimally distributed in the environment being navigated by the receiver.

Preferably, where the method comprises estimating the position of further transmitters, and the further transmitters transmit radio signals of different types, correlating different sets of information comprises determining values for one or more parameters in the equation:

$$c \cdot (\Delta t_{i,j}) = |r_i - b_j| + \epsilon_i - \alpha_j$$

where:
c is the known speed of the radio waves;
$t_{i,j}$ represents the arrival time of the transmission from the $j^{th}$ transmitter at the $i^{th}$ receiver location and $\Delta t_{i,j} = t_{i,j} - t_{i,j}^{pred}$.
the vectors $r_i$ and $b_j$ are positions of the $i^{th}$ receiver location and $j^{th}$ transmitter respectively;
$\epsilon_i$ represents the combined initial clock bias and subsequent clock drift of the receiver, and;
$\alpha_j$ represents the combined initial clock bias and subsequent clock drift of a given transmitter.

Preferably, correlating different sets of information comprises determining values for every parameter in the equation:

$$c \cdot (\Delta t_{i,j}) = |r_i - b_j| + \epsilon_i - \alpha_j$$

According to a fourth aspect of the present invention there is provided a method of estimating the position of a first stationary radio signal transmitter having an unknown position at a radio signal receiver comprising; correlating different sets of information, each set of information corresponding to a different relative position of the receiver to the first transmitter, each set of information comprising:
    radio signal data derived from radio signals received by the receiver from the first transmitter at each respective relative position; and
    positioning data derived from a primary set of positioning resources available to the receiver containing information about the position of the receiver at each respective relative position.

According to a fifth aspect of the present invention there is provided an apparatus, for example a navigation system, arranged to carry out the method according to the first, third and/or fourth aspects of the present invention. The invention also extends to a computer program product (carrier medium) comprising computer readable code that when loaded onto a computer causes it to perform the methods of the first, third and/or fourth aspects of the present invention.

It will be understood that features of the different aspects of the present invention may be combined where context allows.

BRIEF DESCRIPTION OF THE FIGURES

Specific embodiments of the present invention will now be described, by way of example only, with reference to the following drawings in which.

DETAILED DESCRIPTION OF THE PREFERRED EMBODIMENT

For ease of reference, FIGS. 1 to 12 primarily describe determining the position of a stationary radio transmitter. However, it will be appreciated that determining and tracking the position of a mobile radio transmitter is also described—especially with reference to FIG. 12.

Figure 1:
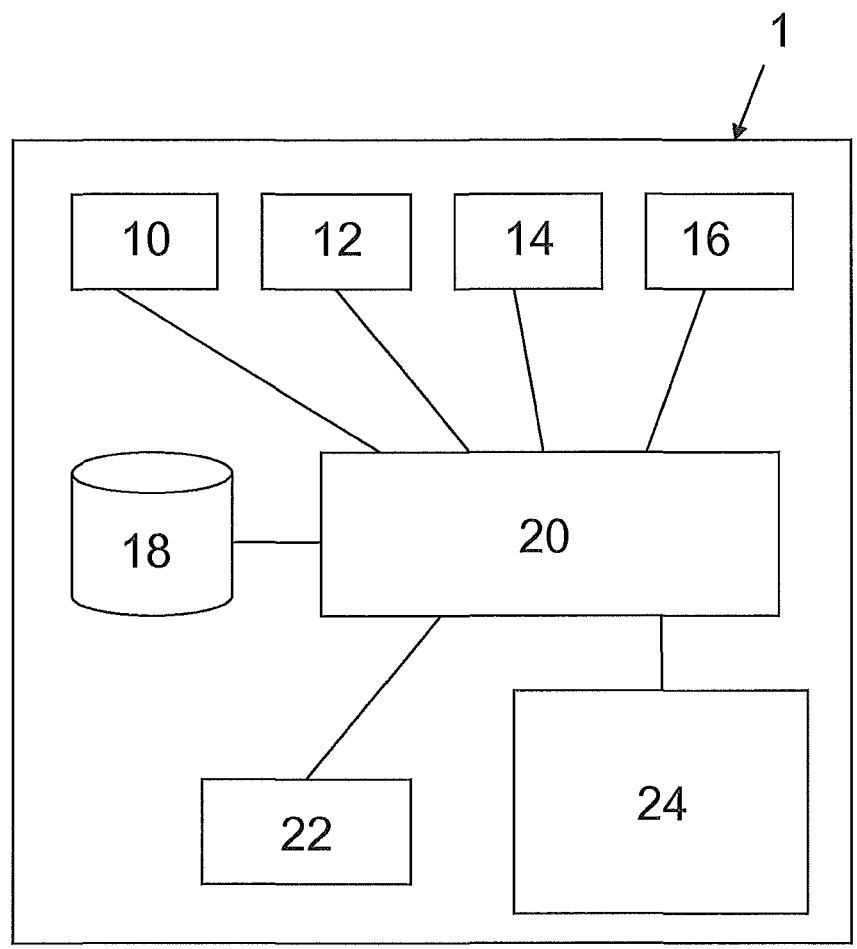
FIG. 1 shows a schematic diagram of a navigation system according to a first aspect of the present invention.

Referring to FIG. 1 there is shown a navigation system 1 according to a first embodiment of the present invention. In the present example, the navigation system 1 is incorporated in a vehicle (not shown).

The navigation system 1 comprises a GPS receiver 10, a GSM receiver 12 and an Inertial Measurement Unit (IMU) 14, an interface module 16, a database 18, a processor 20, a user interface module 22 and a position display module 24.

The GPS receiver 10 and GSM receiver 12 collect data from respective radio signals as is known in the art, and send their data to the processor 20. The processor 20 also receives data from the IMU 14, and optionally, the interface module 16. The interface module 16 is arranged to be connected to other devices, for example receivers arranged to receive radio signals other than GPS and GSM signals. The processor 20 is arranged to store the received data in the database 18. The processor 20 is also arranged to process the data received from input modules 10, 12, 14, 16, and store the resulting processed data in the database 18.

The database 18 also stores map images which are pre-loaded onto the database 18 and fetched by the processor 20 when needed.

Processed data comprises positional data which, together with the appropriate map images may be outputted by the processor to the position display module 24 which can then display an appropriate map to a user showing the location of navigation system 1 on that map. The user interface 22 can also be used by the user to configure the processor 20, and so the operation of the navigation system 1.

The GPS receiver 10 receives GPS radio signals from a number of GPS satellites. Any radio signals that are received are fed to the processor 20 for processing and storage in the database 18. Using prior known techniques, the processor can use data from the GPS receiver 10 to determine the position of the navigation system 1, and display the position of the navigation system 1 to a user, for example overlaid on a suitable map image.

At the same time, the GSM receiver 12 may receive radio signals from GSM transmitters. Any radio signals received by the GSM receiver 12 are also fed to the processor 20. However, in order to use GSM signals—for example for determining the location of the navigation system 1, the processor 20 needs to have access to information about the location of the transmitters of the radio signals received by the GSM receiver 12. In the event that such information is not in the database 18, and cannot be obtained via an external source (for example, by downloading the information), the unknown location of the relevant GSM transmitter can be determined by the navigation system 1 using its existing positioning resources—i.e. using the data received from the GPS receiver 10.

In particular, the location of the GSM transmitter can be determined by correlating the data obtained from both the GPS receiver and the GSM receiver when the navigation system 1 is at a number of locations relative to the GSM transmitter.

Figure 2:
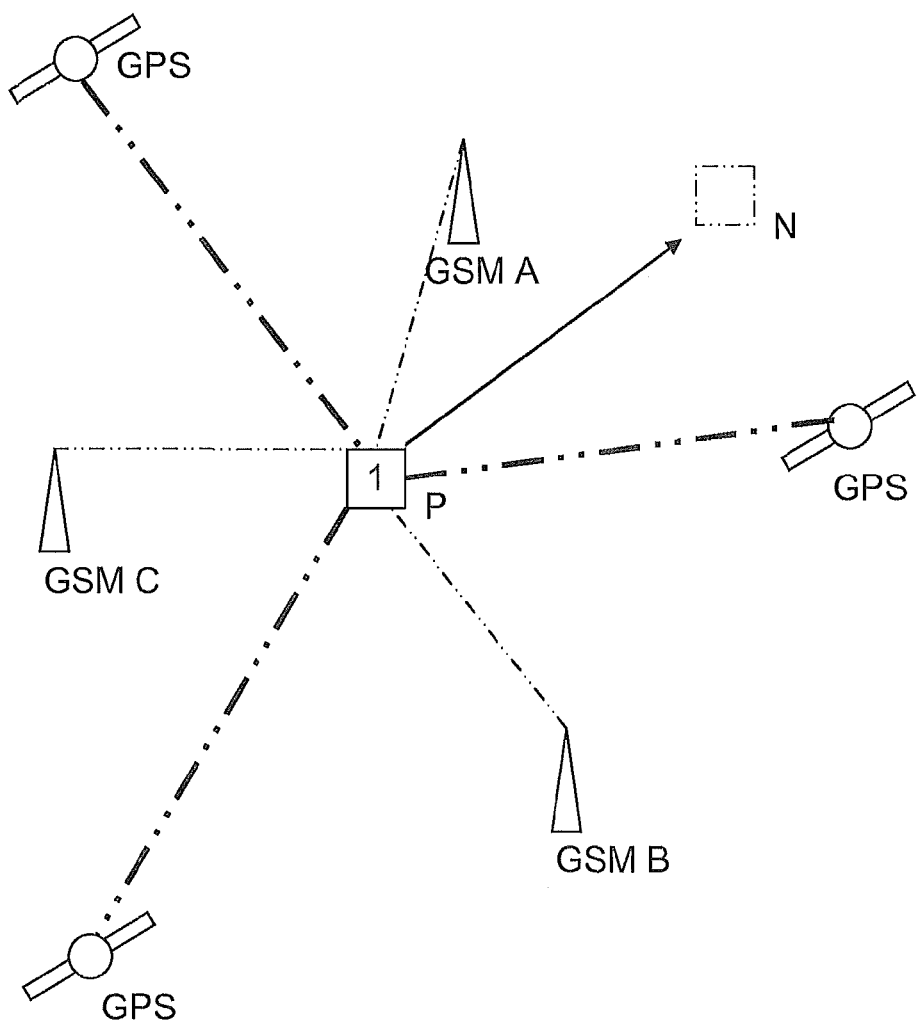
FIG. 2 shows a schematic diagram of the navigation system of FIG. 1, placed relative to GPS and GSM transmitters.

FIG. 2 shows a schematic diagram of the navigation system 1 relative to GPS satellites and ground GSM signal transmitters GSM A, GSM B, GSM C. It is assumed for clarity that the environment that the navigation system traverses is effectively two-dimensional. However, the same concepts are easily adapted for a three-dimensional environment.

When the navigation system 1 is at a first position P relative to GSM transmitter GSM A, it will be able to receive GSM radio signals from that transmitter GSM A that will have a set of signal characteristics particular to that first position P. These signal characteristics can therefore be logged alongside position data derived from the GPS satellites as a first set of information—corresponding to the first position P. The navigation system 1 can then move to a new, second position N relative to the GSM transmitter GSM A, and receive a different set of signal characteristics from the same GSM transmitter GSM A that is particular to the second position N. This can again be logged alongside the GPS position data as a second set of information.

The different sets of information (each corresponding to a different relative position between the navigation system 1 and the GSM transmitter GSM A) can then be correlated with one another to estimate the position of the GSM transmitter GSM A. To improve the accuracy of the estimated position of the GSM transmitter GSM A, further readings of the GSM signals can be taken at further locations, for example, whilst the navigation system is moving. As progressive readings are made and correlated with one another, the location of the GSM transmitter GSM A can be determined with increasing accuracy. When the location of the GSM transmitter GSM A has been determined, it can be added as a positioning resource to the database 18 for future reference by the navigation system 1.

A similar exercise can be performed with GSM signals from further GSM transmitters GSM B and GSM C. The navigation system 1 can receive different GSM signals simultaneously as the GSM signals contain unique signal characteristics (e.g. identification information) distinguishing each GSM signal and thus transmitter GSM A, GSM B and GSM C.

In this way, the navigation system 1 can build up from a primary set of positioning resources (i.e. the GPS satellites alone) a secondary (larger) set of positioning resources (i.e. GSM transmitters GSM A, GSM B and GSM C and also the GPS satellites). Therefore, in the event that the primary set of positioning resources become unavailable, at least in part, the secondary set of positioning resources can be utilised to maintain the ability of the navigation system to self-localise. For example, if there are fewer GPS satellite signals being received by the GPS receiver 10 than necessary to self-localise (using GPS alone) then the navigation system 1 can use additional information provided by the GSM transmitters combined with the available GPS data in an optimal position calculation utilising all available data.

FIG. 2 shows a situation where the navigation system 1 is required to move to different locations in order to pick up different sets of signals from a radio signal transmitters in order to determine the position of that transmitter. It will be understood that the navigation system does not necessarily need to move in order to gather this data.

Figure 12:
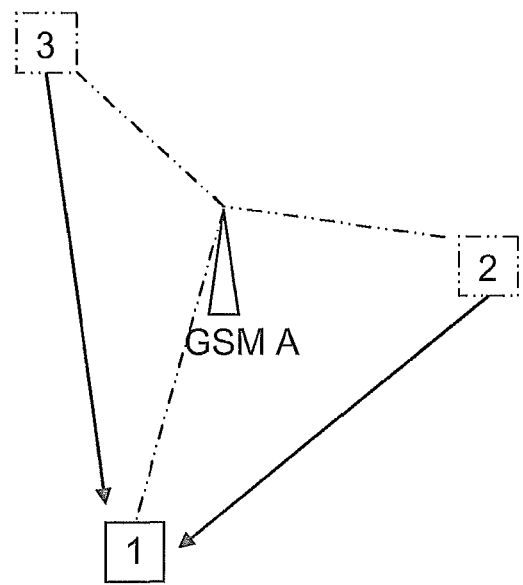
FIG. 12 shows a schematic diagram of the navigation system of FIG. 1 and a GSM signal transmitter of FIG. 2 in a configuration in which the navigation system can remain stationary to determine the position of that transmitter.

FIG. 12 shows a schematic diagram of the navigation system 1 and the ground GSM signal transmitter GSM A of FIG. 2 in a configuration in which the navigation system 1 can remain stationary to determine the position of that transmitter. The remaining GSM signal transmitters GSM B, GSM C and GPS satellites have been omitted in the interests of clarity. In this configuration, the navigation system 1 communicates, via the interface module 16 to additional GSM radio signal receivers 2, 3.

In particular, the navigation system 1 and the radio signal receivers 2, 3 are coordinated to receive a common radio signal transmitted by the radio signal transmitted GSM. The two radio signal receivers 2, 3 pass relevant information to the navigation system 1 which can this information to determine the position of the radio transmitter GSM A.

In particular, the radio signal receivers pass the radio signal characteristics that they receive, along with their own locations (as may be determined by their own respective GPS receivers) to the navigation system 1. The navigation system 1 can then log and correlate the different sets of information in the manner described above to derive the position of the GSM transmitter GSM A.

It will be understood that these additional radio signal receivers 2, 3 may be part of navigation systems almost identical to the navigation system 1 so far described. Therefore, the navigation system 1 and the additional radio signal receivers 2, 3 can work together as a cooperative navigation system.

In this configuration, the position of the GSM transmitter can be resolved without movement of the navigation system 1 or the additional receivers 2, 3 and can be achieved almost instantaneously, assuming good environmental conditions and good receiver geometry relative to the transmitter GSM A.

Radio Localisation

A more detailed description of how the navigation system 1 is able to determine the position of one or more transmitters having initially unknown positions will be now described. It will be understood, however, that the navigation system 1 may be hereinafter referred to generally as a "receiver". For the avoidance of doubt, the processing of data, for example solving equations and the like, is performed by the processor 20 and similarly data values are stored in the database 18.

The calculations that are needed to perform radio localisation are based on the following Equation 1:

$$ct_{ij} = |r_i - b_j| + \epsilon_i - \alpha_j \qquad \text{Equation 1}$$

where:

c is the known speed of the radio waves;

$t_{i,j}$ represents the arrival time of the transmission from the $j^{th}$ transmitter at the $i^{th}$ receiver location;

the vectors $r_i$ and $b_j$ are positions of the $i^{th}$ receiver location and $j^{th}$ transmitter respectively (these may be two-dimensional or three-dimensional as required);

$\epsilon_i$ represents the combined initial clock bias and subsequent clock drift of the receiver, and;

$\alpha_j$ represents the combined initial clock bias and subsequent clock drift of a given transmitter.

In the two-dimensional situation described with reference to FIG. 2, the receiver position are always known at every position (e.g. via the GPS satellites). Similarly, the values of t at each of the locations can be determined by receiving the radio signals at each of those locations and measuring the time at which those signal arrived. Therefore, at any position (i.e. for all values of i) the values for r in the above equation (a two-dimensional vector, e.g. x-y coordinates) are known, as are values for t and the constant c.

Starting with the assumption that the transmitter GSM A from which radio signals are being received is synchronised with the receiver 1 (i.e. The values of $\epsilon$ and $\alpha$ are known), then it is possible to determine the position b (also a two-dimensional vector) of the transmitter GSM A simply by receiving radio signals at the two locations P and N shown in FIG. 2.

This is because there are only two unknowns in the above Equation 1—i.e. the 'x' and 'y' coordinates of the vector b of the transmitter position.

In particular, at the first position P, the known values as a first set of information are entered into a first instance of Equation 1, and at the second position N the known values as a second set of information is entered into a second instance of Equation 1. These two instances of Equation 1 can then be correlated with one another to derive the two unknown (but constant) values—the 'x' and 'y' coordinates—of the transmitter GSM A. This correlation is achieved by solving the two instances of Equation 1 as a simultaneous equation. Therefore after receiving radio signal data from the transmitter A at two separate locations the initially unknown position of the transmitter can be determined.

However, the above example relies on the values of $\epsilon$ and $\alpha$ to be known already. Typically, the values of $\epsilon$ and $\alpha$ are not known. This is because the receiver and the transmitter are generally not synchronised. Therefore, it is not possible to solve the simultaneous equations only after taking two readings from the transmitter.

However, if further simultaneous equations are instantiated in respect of further relative positions between the receiver and the transmitter, it becomes possible to solve these unknown values of $\epsilon$ and $\alpha$.

The values of t, $\epsilon$ and $\alpha$ relate to the flight time of the radio signal. By way of background, radio signal flight time is the time taken for the radio signal to travel from the transmitter to the receiver. Once flight time is calculated, distance between the transmitter and receiver can be calculated easily using the knowledge of the speed of the radio wave, which is generally assumed to be constant.

In order to calculate flight time, the clocks of the transmitter and receiver first need to be synchronised. Once synchronised, then the flight time is simply the time interval between when the transmitter transmitted a signal, and when the receiver received it. A predetermined code-word is generally used to mark the start of a received signal. (It will be understood that synchronisation may not necessarily be a hardware synchronisation, but may simply involve an algorithmic synchronisation—for example using timing offset values).

Generally, determining flight time relies on a number of factors associated with the radio signal to be known in advance and also for the radio signal to be of a suitable type. In particular, the frequency and bandwidth of the radio signal must be known, and the radio signal must contain an element (e.g. a code-word, synchronisation burst, identification code etc.) that is repeated in the signal at predictable intervals. For example, standard GSM radio transmitters are known to have a code-word (known as the extended training sequence) repeated at a rate of around twenty code-words per second.

Thus a radio signal that is monitored over time will have a known code-word repeat rate. A time-plot of a constantly monitored signal will result in the code-word appearing at predictable intervals.

Whilst the receiver is stationary at a first location, from the receiver's clock (typically set as 'time zero') the first received code-word will arrive at an initial offset from time zero. Each subsequent code-word will arrive at the offset plus a known time period associated with the repeat rate.

When the receiver has moved to a second position, each received code-word will arrive at a different offset plus the expected time period. In particular, as the receiver moves towards the transmitter, the code-word position will shift earlier in time, and the offset becomes smaller. As the receiver moves away from the transmitter, the code-word positions shift later in time, and the offset becomes larger.

The amount of shift in the offset directly corresponds to the distance travelled by the receiver relative to the stationary transmitter. Therefore, as the receiver knows its own first and second absolute position (e.g. using the GPS system), and also how far towards or away from a transmitter it has travelled, it can, in this two-dimensional example where the values of, $\epsilon$ and $\alpha$ are not known, generally infer the initially unknown heading of a transmitter after two readings (the two readings being taken at two different positions and distances of the receiver relative to the transmitter). After three readings are taken, assuming the readings are taken at geometrically optimal positions, the initially unknown position of a transmitter can be determined. In practice, a number of readings may need to be taken to determine the position of the transmitter accurately enough. This is generally due to factors such as signal noise and interference.

Once the position of the transmitter has been determined in this way, then the clocks of the transmitter and receiver can be synchronised, or at least, the offset between the clocks of the transmitter and receiver can be accounted for, as will be described.

From then on, the receiver can determine the flight time based on a single received signal from the transmitter without the need for supporting additional information such as its own absolute position (the likely assumption being made that the transmitter oscillator is stable, and so does not suffers too much from clock drift).

Note that the values of $\epsilon$ and $\alpha$ are all expressed relative to an imaginary uniform universal clock, which is achieved in practice by setting one of the values to zero and considering the rest relative to that initialisation (typically the first $\epsilon$ value is set to zero).

Therefore, in the two-dimensional example as stated above, it is possible to determine the position vector b of the transmitter GSM A, which is not synchronised with the receiver, after collecting a minimum of three sets of information—corresponding to three separate relative positions of the transmitter and receiver.

Generally speaking, so long as the value being solved for is a constant (which is true of b as the transmitter location does not change, and also true of $\epsilon$ and $\alpha$ over the short-term and/or assuming a stable oscillator), and the number of unknowns is not greater than the number of instances of simultaneous equations, then the unknowns are usually solvable.

As mentioned, once the position of a transmitter has been determined, it can be added as a positioning resource. In the example shown in FIG. 2, the positions of three transmitters GSM A, GSM B, GSM C have been determined. Therefore, in the event that the primary positioning resource of the receiver is rendered ineffectual (e.g. because of moving through an urban environment which blocks GPS signals), these transmitters GSM A, GSM B, GSM (or rather the radio signals transmitted by these transmitters in conjunction with their determined locations) can be used to determine the position of the receiver using Equation 1.

In particular, in the case that GPS becomes unavailable, then Equation 1 is used to solve/determine the position of the receiver 1 as opposed to determining the position of the secondary positioning resources (which is the receiver's normal mode of operation). Therefore, the values of the equation to solve for are now the 'x' and 'y' coordinate of the position vector r of the receiver (for any one given position of that receiver). By receiving radio signals from the three transmitters GSM A, GSM B, GSM C, three simultaneous equations can be instantiated, and the two unknown values relating to the position of the receiver can be determined. Thus, the receiver can determine its position solely from the three transmitters A, B, C.

Radio Signals of Different Types

In the description above, correlation has involved the solving of multiple simultaneous equations, each being an instantiation of the above Equation 1. In particular, the above Equation 1 is suitable for use with radio signals of the same type, and which are synchronised with one another. In the example given in FIG. 2, the GSM transmitters GSM A, GSM B, GSM C are all of the same type, transmit at the same frequency, and are synchronised with one another (much like GPS satellite signals)—and so the multiple instances of Equation 1 can be generated and easily solved.

However, in actuality GSM transmitters are generally not synchronised with one another. In addition, data derived from radio signals may originate from radio signal sources of different types.

In addition, a situation may arise wherein GPS is only partially available, such that signals from only a few satellites are received, and only one or two of the location-resolved GSM transmitters GSM A, GSM B, GSM C are available. In this situation, it should be possible to utilise information from the different radio signal sources (GPS and GSM) to determine the position of the receiver.

However, the correlation of different sets of data from sources of different type is not straightforward and requires a different approach to allow correlation to occur.

In particular radio signal sources of different types (e.g. GPS, GSM, DAB, DVB) tend to have different signal characteristics, such as different arrival times, different repeat rates and different clock drifts and clock biases which hampers the ability to instantiate multiple solvable simultaneous equations. This is mainly due to the timing values being mismatched. However, a modification to Equation 1 allows these differences to be accounted for:

$$c \cdot (\Delta t_{i,j}) = |r_i - b_j| + \epsilon_i - \alpha_j \qquad \text{Equation 2}$$

where:

$t_{i,j}$ represents the arrival time of the transmission from the $j^{th}$ transmitter at the $i^{th}$ receiver location and $\Delta t_{i,j} = t_{i,j} - t_{i,j}^{pred}$ The arrival times $t_{i,j}$ are measured by their position in the sampling window of each measurement, whilst the values $t_{i,j}^{pred}$ are calculated using the first set of arrival times $t_{1,j}$, the known synchronisation burst repeat rate, and the known time period between receiver measurements as will be discussed below.

The $t_{i,j}^{pred}$ values represent a remapping of the positions of the synchronisation bursts from the first measurement set $t_{1,j}$ into the sampling window of the new measurement assuming that the receiver does not move between measurements and no other corrections need to be made, for example, there is no clock drift, no multipath etc. This formulation and remapping allows the use of multiple source types with different synchronisation burst repeat rates (e.g. GSM transmitters, DAB transmitters, and DVB transmitters) to be used in a single position calculation, all sharing the same value of $\epsilon_i$ the local clock error corresponding to the sampling window containing all of the available synchronisation signals. Simultaneous measurements of different signal types can therefore be used in a single positioning solution. If only one signal type is used for positioning, then the measurement repeat rate can just be chosen to be a multiple of the synchronisation burst repeat rate and $t_{i,j}^{pred}$ will be a constant for each transmitter.

Figure 3:
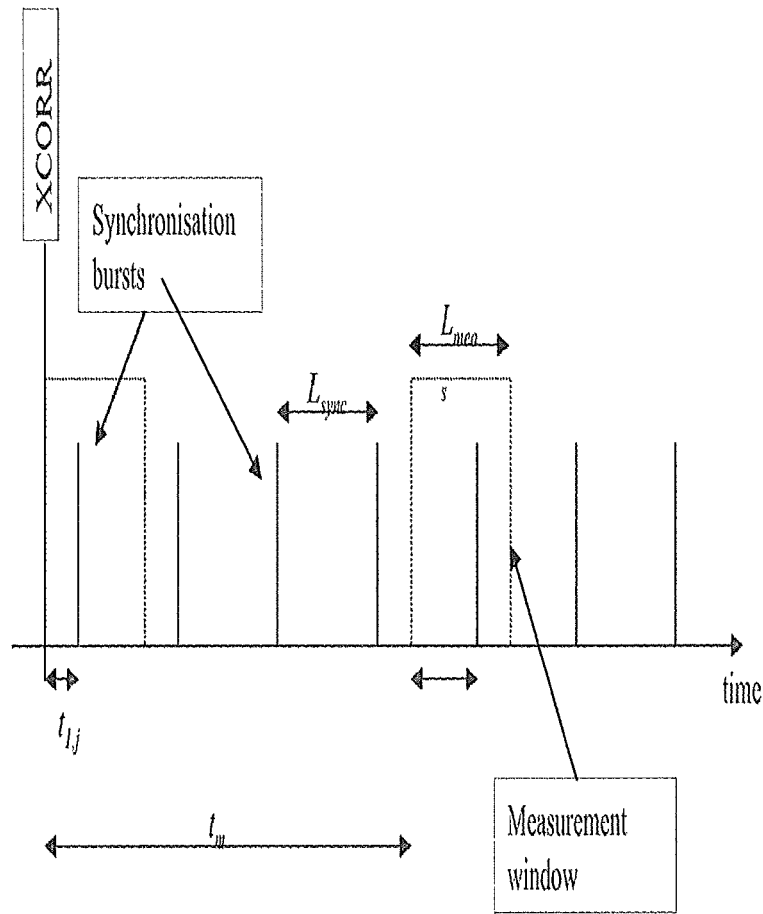
FIG. 3 shows a graph displaying the absolute cross-correlation of signals including synchronisation bursts over time.

The $t_{i,j}^{pred}$ values can be calculated from the following equation, with reference to FIG. 3, which shows XCORR—the absolute cross-correlation of signals including synchronisation bursts over time, when calculating a predicted arrival time of a transmission from a $j^{th}$ transmitter at an $i^{th}$ receiver location, where:

$$t_{i,j}^{pred} = t_{1,j} + \left[ L_{synch} \cdot \text{ceil}\left( \frac{t_m - t_{1,j}}{L_{synch}} \right) \right] - t_m \qquad \text{Equation 2a}$$

where $L_{sync}$ is the time period between synchronisation bursts;
$L_{meas}$ is the length of the measurement sampling window;
$t_m$ is the time period between successive measurements; and, ceil( ) is an operator that rounds the operand up to the next integer value.

The formulation above means that for a stationary receiver, perfect clocks at the transmitters and receiver, and no other timing errors, the arrival time of each successive signal $t_{ij}$ would be identical to the corresponding $t_{i,j}^{pred}$ values. This ensures that the $\epsilon_i$ and $\alpha_j$ values provide direct measurements of the local clock drifts and transmitter clock drifts respectively.

Thus it is possible to correlate information derived from radio signal transmitters of different types to determine unknown parameters such as the location of the receiver and/or the location of those transmitters of different types.

Alternatives to Equation 1

As demonstrated, there are a number of ways of determining the position of a transmitter and receiver other than the direct application of Equation 1. For example, as described in the co-pending United Kingdom patent application number GB1013413.8 it is possible to determine the position of a mobile receiver using a differential positioning method.

In particular, when the mobile receiver is at a first known position, it is possible to establish a virtual positioning reference. This is achieved by logging the known position of the mobile receiver together with a local time at which a first instance of a predictably repeated code word is received by the mobile receiver from a terrestrial radio signal transmitter having a known position, the local time being measured relative to a clock local to the mobile device. From there, the local clock is run during movement of the mobile receiver from the first known position to a second unknown position. When the mobile receiver is at the second unknown position, the local clock can be used to determine the time difference between when the virtual positioning reference is predicted to receive a second instance of the code word and when the mobile receiver actually receives the second instance of the code word, and thereby determining the position of the mobile receiver.

Advantageously, this alternative method exploits the clock stability of the transmitter from which a virtual positioning reference is established. The clock offset associated with the transmitter will not change over the time during which the mobile receiver is moving between the first and second position. Assuming a stable transmitter clock, it is possible to relieve the mobile receiver from the computational burden of needing to calculate the transmitter clock offset. This value is simply eliminated during the step of determining the time difference between when the virtual positioning reference is predicted to receive the second instance of the code word and when the mobile receiver actually receives the second instance of the code word. In other words, because a differential method is used for determining the position of the mobile receiver, it is not necessary to calculate the transmitter clock offset. This will only be valid if the transmitter clocks exhibit high levels of stability since the creation of the most recent virtual positioning reference. Modern digital opportunistic signal sources such as cellular, DAB, DVB, etc transmissions exhibit such high stabilities and would allow such a method to be utilised for many hours after establishing a virtual reference.

For the avoidance of doubt, it will be understood that the determined time difference is associated with the change in position of the mobile receiver from the first position to the second position relative to the transmitter.

In more detail, the method may comprise applying the equation:

$$c(t_{new}-t_{ref})=|r_{new}-b|-|r_{ref}-b|+(\alpha-\alpha)+(\epsilon_{new}-\epsilon_{ref})$$

where:
 c is the known speed of the radio waves;
 $t_{new}$ represents the time, measured at the mobile receiver using the local clock, at which the second instance of the code word is received by the mobile receiver at the second position;
 $t_{ref}$ represents the time, measured at the mobile receiver using the local clock, at which the virtual positioning reference is predicted to receive the second instance of the code word;
 $r_{new}$ is the new (second unknown) position of the mobile receiver;
 b is the position of the stationary transmitter;
 $r_{ref}$ is the reference (first known) position of the mobile receiver;
 $\alpha$ represents the transmitter clock offset;
 $\epsilon_{ref}$ represents the error of the clock local when the reference measurements ($t_{ref}$) were established; and
 $\epsilon_{new}$ represents the error of the clock local to the mobile receiver.

Advantageously, clock errors are removed by this virtual position reference technique as long as the transmitter clock offset values $\alpha$ are stable during the time period over which the mobile receiver is moving between the first known position and the second unknown position.

Estimation and Error

So far, the above equations have been used to exemplify the operation of systems in which parameters are either known, or not known (and therefore need to be solved). In these systems, the general approach is to obtain enough readings to instantiate a sufficient number of simultaneous equations (of Equation 1 or Equation 2) to solve the unknown values.

However, in practice, a large number of readings are necessary to account for degrading factors such as signal noise, variable signal geometry, multipath interference and inaccurate estimates of the receiver location derived from the navigation system's positioning resources.

Therefore, in practice, the values of most of the parameters of the above positioning equations are not known as an absolute value, but rather must be expressed as an estimated value, for example as a parameter value and an associated error value.

Referring back to FIG. 2, it will be understood that when the navigation system 1 is first initialised at position P, parameter error values may be relatively high, but then as the navigation system 1 moves to N and then to further locations, and picks up further data to aid with the process of correlation, the errors can be decreased.

Thus, as well as solving for unknown values, it is also possible to maintain a plurality of different sets of information (each corresponding to a different transmitter-receiver location)—which contain parameters with estimated values. These sets can then be correlated with one another, and as further sets are generated and correlated, the error in the estimated values of the parameters may be reduced.

The correlation of data—in particular, solving multiple simultaneous equations containing error values, can be achieved by using a least squares fit approach using a matrix inversion as is known in the art. However, this approach is unsatisfactory, as will be described, and the present invention uses another particularly effective way of correlating data containing error values.

Bayesian Estimation Techniques

In particular, a filter which applies a Bayesian estimation technique is used. For example, a Kalman filter, a particle filter or other such positioning filter can be utilised in calculating parameter solutions more effectively than a least squares fit approach. In particular, the filter can be loaded with certain assumptions and likely parameter error value distributions.

The assumptions made may be from known or measured characteristics of the navigation system 1 or its environment. For example:

data from the IMU 14 may be used to provide each new position prediction, which can then be updated using the data from the external measurements (these are referred to by those skilled in the art as the 'predict' and 'update' steps of navigation filtering).

the known Allan variance behaviour of the receiver clock may be used to predict the likely error associated with the receiver clock (this is particularly relevant where the navigation system 1 is a relatively inexpensive system, and has a crystal oscillator having poor stability);

similarly if one or more of the transmitters are of a known type, then the navigation system may look up, in the database 18, whether there is a known clock/timing error model associated with that transmitter. If there is no error model in the database for a specific transmitter, then an assumption may be made based on the transmitter type. For example, the frequency references of cellular, digital radio and digital television transmissions are known to typically be highly stable and so the a values associated with such transmitter will typically vary very slowly.

timing error models may be used if the signal environment and signal characteristics are known well enough.

These assumptions constrain the Bayesian estimation filter so that the output of the filter can converge onto a particular solution. This is more effective than, for example, a least-squares-fit approach.

Use of a Reference Receiver

In the above example, reference is made to using assumptions and error models to constrain the filter. If error models are not available in the database 18, then it is also possible to obtain the error models, or actual errors from another source. Specifically, a values (i.e. clock drift) of an unknown transmitter can be determined by a further positioning resource such as a stationary reference receiver, separate from, but in communication with the navigation system 1. For example, the stationary reference receiver, can monitor the behaviour of transmitter broadcasts and so infer any drifting of the $\alpha_j$ values. The reference receiver may be placed in a distant optimum position where GPS lock can be maintained such that the reference receiver's local reference is locked to GPS and therefore highly stable (i.e. the reference receiver's $\epsilon_j$ values drift very slowly). Alternatively the reference receiver may use an atomic frequency standard. The variation in the $\alpha_j$ values for the local transmitters can then be communicated to the navigation system 1 such that the estimates of $\alpha_j$ in the positioning filters can be updated with a high degree of confidence rather than be estimated as part of the positioning solution. Note this method of differential corrections differs from an interferometric approach where the entire signal capture is transmitted between receivers. Here, only the alpha values and estimates of their error are transmitted, requiring a much lower communication bandwidth.

The reference receiver may alternatively broadcast its entire set of measurements to the moving receiver, allowing a differential calculation to be performed to remove the drifts in the $\alpha_j$ values completely.

Bayesian Estimation Filter and Error Handling

Thus, returning to the scenario shown in FIG. 2, but where values for receiver position and transmitter positions are only known to an accuracy of a kilometer or so, (and the corresponding initial estimates of $\alpha_j$ are similarly degraded) the parameter values and error values still allow a filter be constrained. Estimates of the errors on these values can be overestimated to ensure stability (although the time to confident convergence will increase with the magnitude of these initial error estimates).

For larger initial errors, multiple solutions may initially be processed, such that many filters run in parallel, each with slightly different initial conditions. The filters can be scored and compared, with diverging filters discarded and high-scoring filters kept until one filter has clearly converged on the correct solution and consistently scores higher than the other filters. The scoring consists of comparing expected measurements with real measurements. If the vehicle's dynamic motion is smooth and the measurement rate is high, then dead reckoning can be employed to give a reasonable estimate of the moving vehicle's location during the next measurement. This position estimate can then be used to predict what the signal measurements will be. These estimates are then compared to the real measurements. The differences between these predicted measurements and the real measurements provide a metric for the accuracy of the initial conditions; these differences will be small consistently for filters with initial conditions close to truth, and large for filters with poor estimates of the initial conditions.

Test Scenarios

Figure 4:
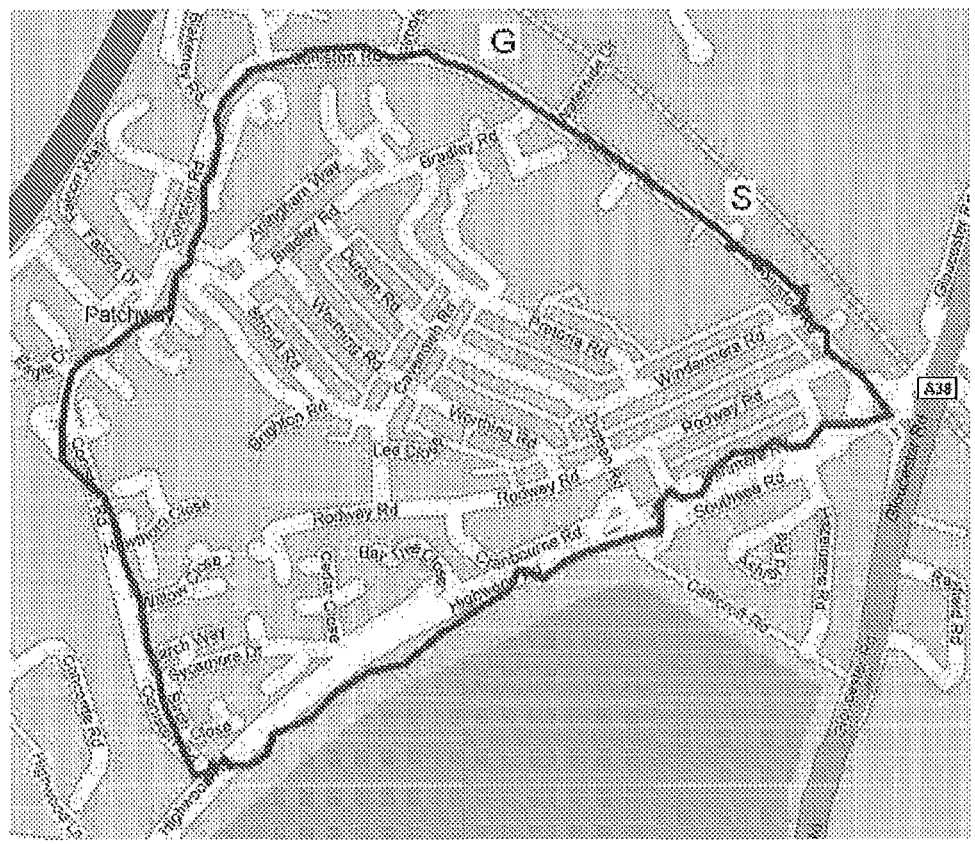
FIG. 4 shows a map of an area near Bristol in England used to test the navigation system of FIG. 1.

Referring to FIG. 4, there is shown a map of a test area near Bristol in England. The map shows the estimated position of a mobile navigation system 1 over time, and therefore the path taken by the navigation system 1.

The position of the navigation system 1 at the start, indicated by reference S, and for the first 500 meters (i.e. between reference point S and G) was determined to a high accuracy using GPS. At reference point G the navigation system 1 was GPS denied, and so had to navigate based on GSM-based opportunistic radio signals from the GSM transmitters. The locations of the GSM transmitters were known to within a few meters—as obtained through surveying of the local area. This scenario therefore represents an unchallenging situation where the filter can initially be constrained reasonably well.

The navigation system 1 moved from the known starting position S and gathered timing data from opportunistic GSM signals. Each recording was associated with a simultaneous location measurement by GPS. Timing measurements were recorded and these measurements were used along with the known navigation system 1 locations to generate initial estimates of the and e parameters via the above Equation 1. The estimates of the parameters improved as the spatial environment was sampled, i.e. the accuracy of the system was determined by the physical separation of the measurements, not by how many were performed over time.

Once the navigation system's location could not be determined via GPS (after point G), the calibration process ended. Any remaining unknown values (for example, the navigation systems position) were then calculated by solving the resulting multiple instances of Equation 1—populated with parameter values that had been generated during the calibration process.

To solve the multiple instances of Equation 1, a Kalman filter, a particle filter, and a least-squares fit approach was used.

The track shown in FIG. 4 was produced using a Gaussian-mixture-model-based Kalman filter loaded with a dead reckoning vehicle model. The particle filter and least-squares fit approach produced similar tracks. However, the least-square fit approach was the most error-prone.

Figure 5:
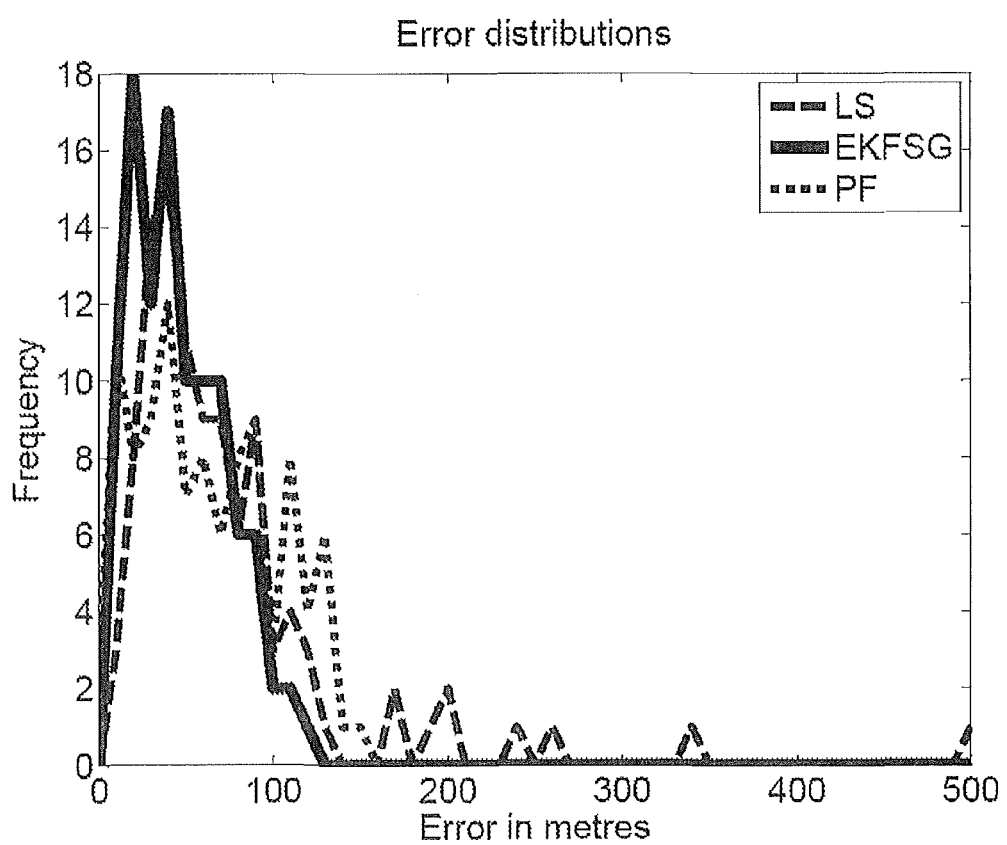
FIG. 5 shows the error distributions for different filters used in localisation of the navigation system of FIG. 1.

Referring to FIG. 5, the error distributions for a least-squares batch process (LS) a Kalman-based filter (EKFSG) and particle filter (PF) is shown. The Bayesian estimators produced better results by filtering spurious large errors caused by multipath interference using non-Gaussian error models. The least-squares batch estimate method is not robust to such highly non-Gaussian errors.

FIGS. 6 to 9 show the results of a more challenging test, where Kalman-filtered estimates of the base-station locations at various times during the more challenging test are shown. The transmitter locations were estimated with a random error in the range of 200 meters to 500 meters (the circles marking the assumed error on each position estimate have a diameter of one kilometer). The black dots represent the true transmitter locations. The 'inverted L'-shaped line represents the ground truth of a course taken by the navigation system 1. The ellipses represent the uncertainty on the locations of the transmitters and the receiver/navigation system 1. As the test proceeded (moving from FIGS. 6, to 7, to 8 then to 9) markers appear on the plots, marking the location estimate of the vehicle calculated using the process described above and also the position of GSM radio signals. The position of the receiver over the first 200 meters was correct to within 10 meters and the velocities were correct to within 1 ms−1, and the associated uncertainty in the filter reflected this.

In the case of poorer estimates of the receiver's starting position and transmitter coordinates, a number of filters could be processed simultaneously each with slightly different initial parameters. These filters could each be scored by considering the difference in the expected measurements and the actual measurements at each new measurement step. The low scoring filters would be discarded and eventually only the filter with initial parameters closest to the true values would remain.

Figure 6:
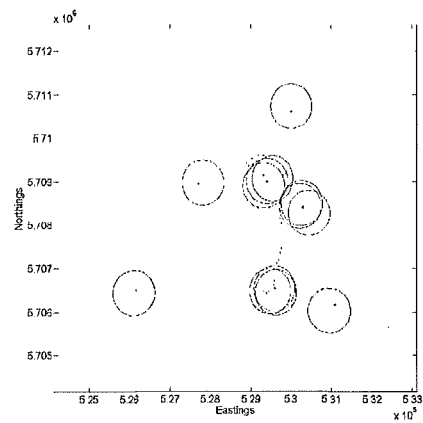
FIGS. 6 to 9 show results of a test where Kalman-filtered estimates of base-station locations are shown during movement of the navigation system of FIG. 1 relative to those base-stations.
Figure 7:
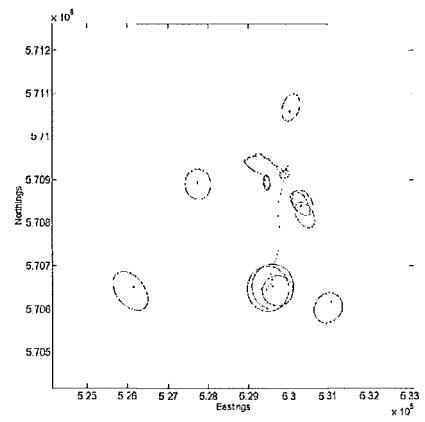
Figure 8:
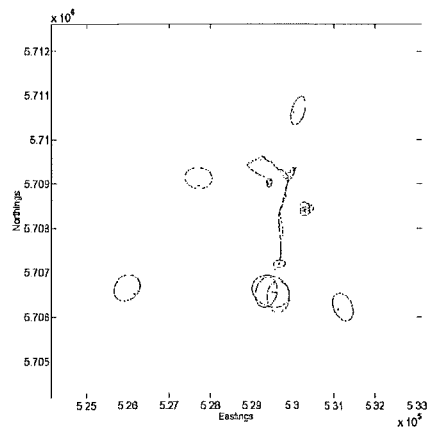
Figure 9:
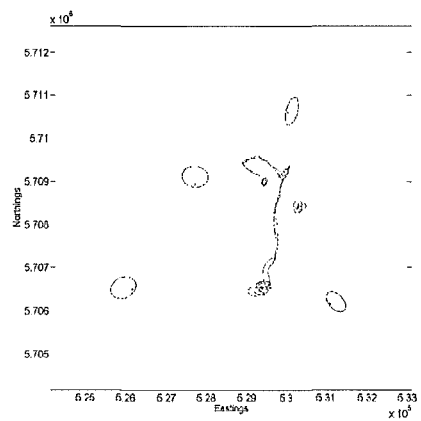

FIG. 6 shows the initial estimate of the source locations and the uncertainties associated with each in the Kalman filter. Each circle is 1000 meters in diameter, representing the initial uncertainty in the source locations. The accuracies of the initial estimates of the source locations vary in the range 200 to 500 meters. FIG. 7 shows the source location estimates after the receiver has moved ⅓ of the distance along the track; FIG. 8 the source location estimates after the receiver has moved ⅔ of the distance along the track; and FIG. 9 the source location estimates after the receiver has moved the full distance along the track. The accuracy of the estimate is dependant on the region around the source sampled by the receiver, and on the number of measurements recorded from that transmitter, with the best estimates achieved by sampling a 180 degree swath or more around the source across dozens of measurements. Some sources are represented by more than one ellipse because there is more than one transmitter at that location.

Figure 10:
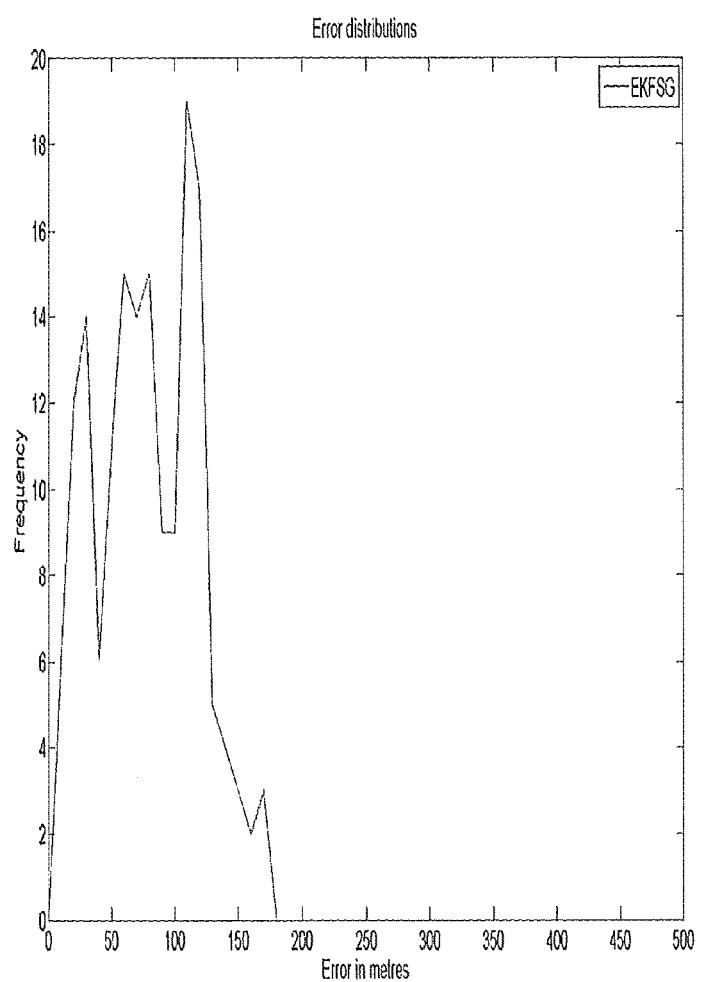
FIG. 10 shows the error distributions associated with the estimated position of the navigation system of FIG. 1 during the navigation process described with reference to FIGS. 6 to 9.

FIG. 10 shows the error distributions associated with the receiver's estimated position during the process described with reference to FIGS. 6 to 9.

Use of Other Types of Signals

So far, the navigation system 1 has been described to achieve localisation by using opportunistic radio signals derived from GSM transmitters. However, it will be appreciated that alternatives are possible—for example, the opportunistic radio signals may include television signals, WIFI signals, or signals broadcast by dedicated beacons placed by a user.

Further to this, positioning accuracy can be greatly improved by using higher-bandwidth signals as the timing errors associated with coherent multipath interference are greatly reduced. Television and 3G signals are suitable, but have a lower availability, due to the sparse distribution of television sources and the co-channel interference effects of 3G networks.

A simulation was run consisting of three signal sources (representing one television and two 3G sources) and a short calibration period to prevent the least squares estimator from diverging. Neither a reference receiver nor an IMU was used in the simulation. The accuracy of the EKFSG filter in this case is 12 meters at the 66% confidence interval, 19 meters at the 95% confidence interval and 24 meters at the 99% confidence interval, which are comparable with a GPS solution using twice as many sources. A GPS solution using only four satellites typically carries an error of around 60 meters with 99% confidence.

Other Localisation Techniques

Localisation techniques have been described above that can be used to determine the position of a radio signal transmitter and/or radio signal receiver. The general approach used is to instantiate sufficient numbers of simultaneous equations to be able to solve for unknown values—primarily by correlating the different sets of information containing values of parameters in those equations. Specific examples have been given for radio localisation—in particular, see Equation 1 and Equation 2 above. Here, timing or phase measurements form the main basis for localisation.

However, it will be appreciated that this general approach can be adapted for other localisation techniques and, moreover, different approaches can combine with one another to allow for values associated the location of a radio transmitter/receiver to be determined, or at least constrained.

For example, a combination of techniques such as radio localisation, radio triangulation, signal fingerprinting, application of radio propagation models, signal strength measurement and the like may be used. The known equations or algorithms used as part of these techniques can, in addition, be solved through the application of a Bayesian estimation filter.

For example, signal strength can be used simply as a differential metric (getting stronger or weaker) to suggest the direction of the source, or the expected signal strength on broadcast may be known or inferable. For example, certain Commercial-Off-The-Shelf (COTS) walkie-talkies operate in certain bands, and the broadcast power of the devices is known. In this case, the range to the walkie-talkie radio transmitter can be estimated on the basis of signal strength.

A navigation system utilising signal strength as a metric could also utilise radio propagation models in dependence on the operating environment to improve the usefulness of the signal strength models. Radio propagation models can typically predict the behaviour of a radio signal being propagated via different environments and conditions such as indoor, outdoor, near-earth, sky, urban, sub-urban etc.

Arrival angle determination is also a useful technique that can be used in combination with both signal strength determination and timing/phase measurements. For example, when attempting to determine the location of a new source, arrival angle provides important information that can greatly reduce the initial uncertainty on the radio signal source's location (especially when only timing information is available), and so helps to bound the estimate and prevent applied Bayesian estimation filters from diverging. (The alternative when no angular information is available is multiple initial guesses for the location—as discussed above. This will result in either convergence or divergence, depending on the filter applied and so many filters are typically applied simultaneously. Simultaneous maintenance is much more processor-intensive than when the location has been bounded by an angular measurement and so it can be advantageous to use different localisation techniques (if possible) to determine location).

It will be noted that signal strength and angle arrival determination are useful techniques to obtain information for intermittent broadcasts from an analogue device with no timing broadcasts (eg an FM walkie-talkie).

When these two techniques are used to determine the location of the receiver, they can potentially flag up erroneous signal behaviour so that the measurement can be discarded (i.e. aid in detecting multi-path interference, for example, detecting the same signal arriving from multiple directions, or from a fluctuating direction), and to provide crucial measurements for simple signal sources (such as intermittent broadcasts from a walkie-talkie) for which timing information is not available.

Techniques that aid localisation (particularly receiver localisation) also include signal fingerprinting. This involves generating database entries of signal strength measurements at known locations (e.g. via GPS) as a receiver is moved relative to a transmitter. These database entries can later be used as a lookup table when a receiver's previous method of localisation (e.g. GPS) becomes denied.

It will also be noted that if a navigation system has access to data from a directional antenna or a phased antenna array, signal arrival angle data alone can be used to estimate the receiver's location and its heading if required (triangulation).

Thus, by incorporating a number of different localisation techniques/metrics (for example, time/phase measurement, signal strength measurement and signal arrival angle measurement) within a single positioning filter within a SLAM framework can vastly improve the simultaneous self-localisation and tracking of new/unknown sources.

Improved Transmitter Tracking

So far the invention has been described primarily as a navigation method and system 1 that can be used to determine the position of stationary radio signal transmitters for the purpose of using those radio signal transmitters as positioning resources to be used in the event that the navigation system 1 loses its primary navigation system—(GPS).

However, the navigation system 1 can also take advantage of the techniques described herein for other purposes, in particular, allowing the improved tracking of the position of one or more radio signal transmitters that are at unknown locations and may be of unknown types—particularly types which may be mobile.

In particular, different sets of data can be correlated with one another to track the position of a radio signal transmitter, and the estimation of the position can be improved via the application of Bayesian estimation techniques already described that relates to loading a Bayesian estimation filter with certain assumptions and likely parameter error value distributions.

When the navigation system 1 receives data from a radio signal source, the radio signal source type may not be known. For example, it may not be known whether or not the radio signal source is a mobile radio signal source. As mentioned previously, it would be advantageous to determine the type of the radio signal source as this would improve how the different sets of radio signal data are correlated against one another.

The navigation system 1 stores in its database 18 a set of rules and assumptions that may be made about radio signal sources of different types. Thus when a radio signal of an unknown type is detected, the navigation system 1 can consult its database 18 to attempt to infer the type of the radio signal source. This is done by analysing the different radio signal characteristics. Radio signal characteristics include frequency, bandwidth, the modulation scheme, the interleaving scheme, the repeated code word, and/or the repeat rate of the code word.

Figure 11:
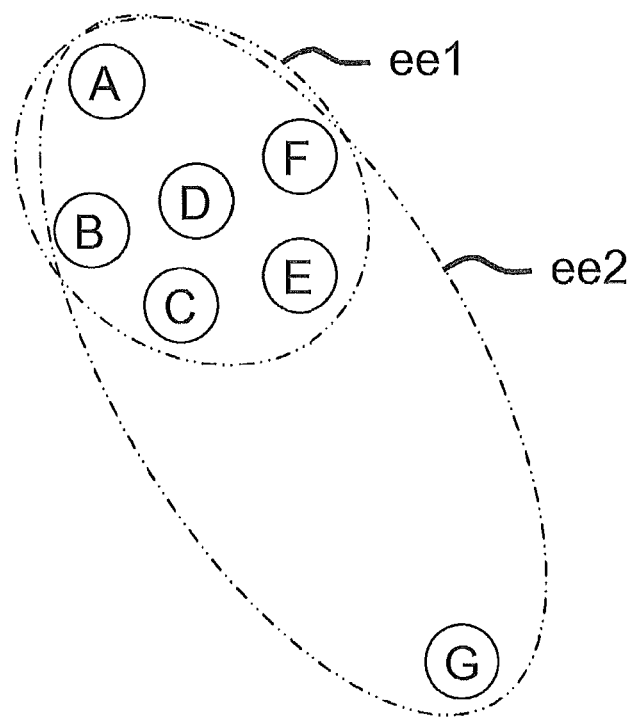
FIG. 11 shows a schematic diagram of how error ellipses may be defined after receiving a number of readings of the position of a radio transmitter from the navigation system of FIG. 1.

After the type of the radio signal source has been determined, the radio signal data received from that source can be correlated in accordance. For example, if the radio signal source is inferred to be of a type that is stationary, then the Bayesian estimation filter can be loaded in a way that assumes that there will be no movement. If the radio signal source is inferred to be of a type that is mobile, then the Bayesian estimation filter can be loaded in a way that allows for the likely movement of the radio signal source (e.g. the mobility of a radio signal source can be defined in terms of velocity and acceleration values and ranges). Referring to FIG. 11, the former 'stationary' filter would typically discard the radio signal data resulting in estimated position G as spurious, whereas the latter 'mobile' filter could allow for G to be a genuine reading.

In addition to determining the mobility of the radio signal source other assumptions can also be made. For example, the expected platform for that radio signal source, the expected maximum detectable range and the expected device producing the radio signal. Table 1 provides an example set of assumptions made on the basis of frequency range:

TABLE 1

| Frequency Range | Expected Device | Expected maximum detectable range | Expected Platforms | Expected Dynamics |
|---|---|---|---|---|
| Cellular Uplink Bands (e.g. 800/900/1800/1900) | Cellular telephone (verifiable by bandwidth and signal structure) | Below 30 km | Pedestrian or ground vehicle | Max velocity below 50 metres per second, accelerations of 1 g-3 g. |
| 30 MHz-512 MHz | Commercially available walkie talkies (verifiable by bandwidth and signal structure) | Frequency dependant, inferred from known power output of known COTS devices for given frequency band | Pedestrian or ground vehicle | Max velocity below 50 metres per second, accelerations of 1 g-3 g. |
| Known friendly military bands | Bowman radio, etc | Frequency dependant, inferred from known power output of known devices for given frequency band | Pedestrian, ground or air vehicle | Unrestricted for devices known to be used in aerial vehicles |

TABLE 1-continued

| Frequency Range | Expected Device | Expected maximum detectable range | Expected Platforms | Expected Dynamics |
| --- | --- | --- | --- | --- |
| Cellular downlink bands, public broadcast radio and television bands (MW, VHF, UHF, DAB, DVB), etc | Static transmitter (verifiable by bandwidth and signal structure) | Variable depending on required coverage area | Stationary mast | none |
| Other | Unknown—educated guess based on operational environment, current theatre of operation, etc | Unknown—educated guess based on operational environment, current theatre of operation, etc | Unknown—educated guess based on operational environment, current theatre of operation, etc | Based on educated guess of expected platforms in current operational environment and theatre. |

In the case that the radio signal characteristics are not known, the navigation system may be arranged to work out such characteristics by analysing the radio signal. Whilst this can take longer than looking up the relevant information in a database, this makes the system more flexible and amenable to receiving, localising and effectively utilising radio signals that are not specified in the database.

When collecting radio signal data, the navigation system 1 may make assumptions that may be incorrect or incomplete. This is because the system may only have a limited set of automatic inputs. Therefore, to overcome this drawback, the navigation system 1 is arranged to allow the database 18 to be updated with new information about assumptions and likely parameter error value distributions on the basis of received radio signal characteristics. In particular the navigation system 1 is arranged to allow the assumptions data to be updated via user input or communication with external devices—for example, with other navigation systems or receivers 2, 3 via the interface module 16. In addition, assumptions can be made on the basis of other radio signal information available to the navigation system such as signal strength and angle of signal arrival.

Figure 13:
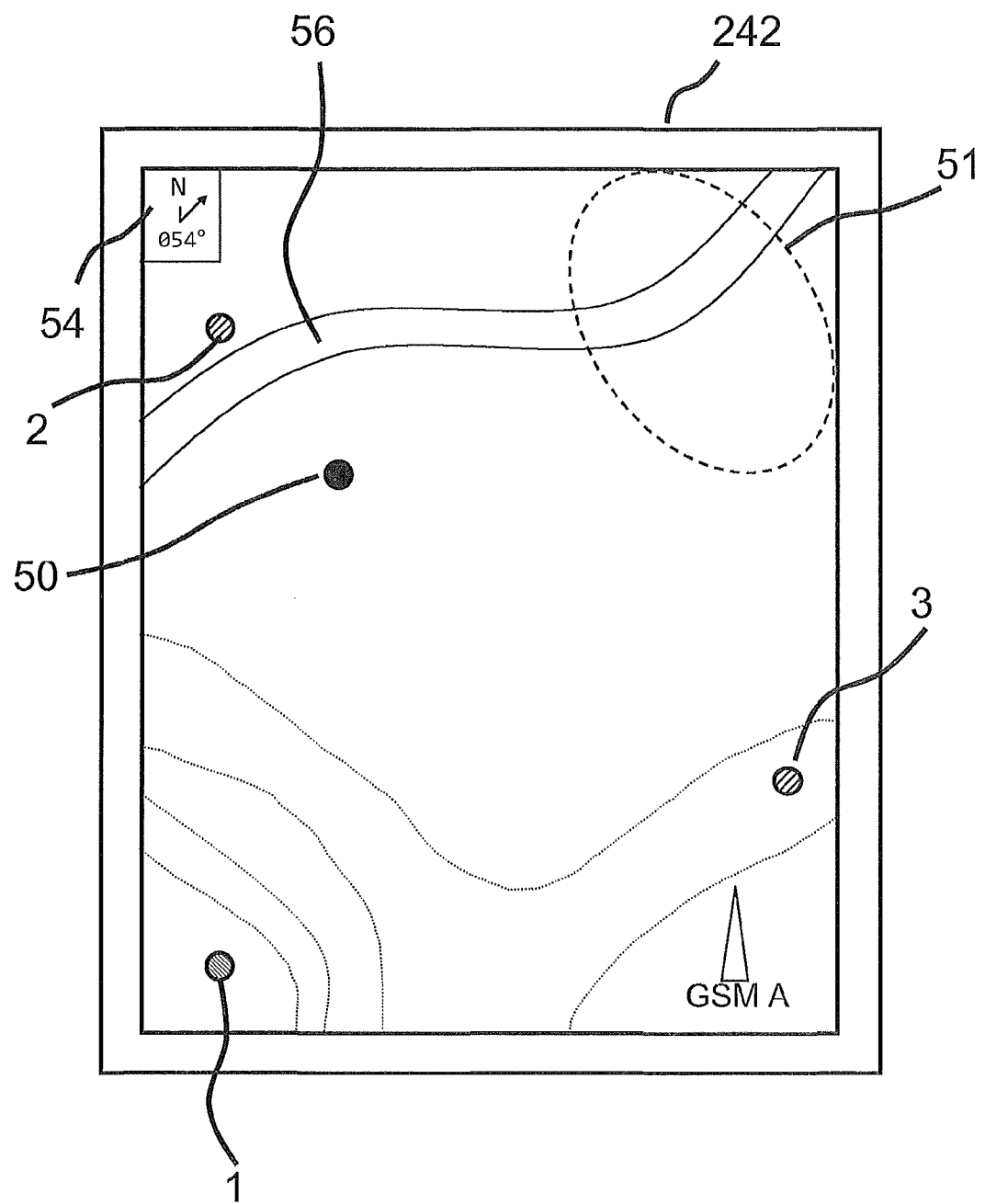
FIG. 13 shows a user interface module 22 and position display module 24 of the navigation system of FIG. 1.

Referring to FIG. 13, there is shown the user interface module 22 and position display module 24 of the navigation system 1 which are integrated as part of a touch-screen display 242. The touch-screen display 242 is arranged to display a map which may comprise features such a contour lines (shown as dotted curved lines) and other representations of the environment in which the navigation system 1 is located—for example, one of the representations is of a local road 56. The position of the navigation system 1 is shown on the map along with the positions of a second receiver 2 and a third receiver 3. The second receiver 2 and the third receiver 3 are in communication with the navigation system 1 via the interface module 16 of the navigation system 1, and pass their position in the form of GPS coordinates. (It is assumed for the purpose of this example that second and third receivers 2, 3 are apparatus having the same feature as the present navigation system 1).

The Inertial Measurement Unit (IMU) 14 of the navigation system 1 comprises a digital compass the output of which allows the touch-screen display 242 to show a bearing 54 corresponding to the orientation of the navigation system 1.

Transmitters may be represented on the touch-screen display 242 in the form of a suitable icon and may be given a label. When the position of a transmitter is determined, it can be positioned on the map at the appropriate position. For example GSM transmitter GSM A is shown on the bottom half of the map as a triangle, and is given the label "GSM A".

When the navigation system 1 picks up a radio signal from a further unknown radio signal transmitter 50, this can also be represented on the touch-screen display 242. Through communication of radio signal data with the other receivers 2, 3, the position of that unknown radio signal source may be determined, and so it can be accurately positioned on the map of the touch-screen display 242. However, in addition to the radio signal data that is communicated with the other receivers, other information, for example, assumptions data can also be communicated between the second and third receivers 2, 3 and the navigation system 1.

For example, the second receiver 2 is shown to be closer to the unknown radio signal source 50 than the navigation system 1 or the other receiver 3. Therefore, the user of that receiver 2 may be able to visually identify the radio signal source as a radio mast of a particular specification. Therefore, this information can be communicated to the other receiver 3 and navigation system 1 so that the appropriate filter can be applied when tracking this radio signal source. In this case, a Bayesian estimation filter may be chosen that accounts for the error model of the clock drift of that particular specification of radio mast. It will be understood that as well as assumptions data, data pertaining to radio transmitter specifications (and suitable filters for such specifications) can also be transmitted between the navigation system 1 and the receivers 2, 3.

The user of the receiver 2 closest to the initially unknown radio signal source 50 may select the icon representing that radio signal source 50 and assign it a label, and make selections about its type—for example, the fact that this particular radio signal source is a stationary radio signal source. The chosen icon type, the label and other items associated with the specification of the radio signal source can then be forwarded to additional receivers and navigation systems 1.

A second radio signal source 51 may also be detected by the navigation system 1 and the two receivers 2, 3. However, due to the poor signal geometry and signal quality, the exact position of this radio signal source may not initially be exactly determined, instead being represented by an error ellipse 51 defining the general area of the radio signal source.

The navigation system 1 may assess the information available to it and present a suggestion as to how information to aid localisation—for example, better quality radio signal information can be collected. For example, the navigation system 1 may determine that the navigation system 1 or receivers 2, 3 could move in a particular direction to get closer to and/or improve the geometry of the receivers relative to the unknown radio signal source.

It will be noted that whilst the error ellipse is represented diagrammatically on the map of the touch-screen display 242, this may actually be stored in the database 18 of the navigation system 1 and may be passed between different navigation systems 1 and receivers 2, 3 as a set of values or equations—for example, as a variance/covariance matrix.

Alternatively, instead of presenting a suggestion, missing data can simply be provided by the user. For example, if the user of the navigation system 1 and the user of the receiver 3 are able to see a feature in the distance that is likely to be the second radio signal source 51 (even though they may not know the type of this source) this information can be provided to the navigation, and is of use in localising the unknown radio transmitter.

Using the digital compass, the user of the navigation system 1 can enter the bearing at which the second radio source 51 has been sighted (and the user of the receiver 3 may also do the same). This information is shared amongst the navigation system 1 and receivers 2, 3 and it can be determined from this information that the radio signal source is likely to be positioned exactly on a stretch of road 54. From this information, a further assumption can be made and entered into the system that the radio signal source is likely to be a mobile radio signal source—most likely originating from a vehicle moving along the road. Further information can then entered into the system and the appropriate filter can then be chosen. For example, the users of the system can choose to enter into the navigation system 1 that the radio signal source is not only mobile, but also is highly likely to have its movement constrained to that following the road, along with the dynamics of the movement.

Thus, it can be seen that the navigation system 1 provides a useful way of presenting information about radio signal sources to a user, and allowing the customisation of that information—not only in terms of how it is represented (choice of icons, etc)—but also specification of data, rules and assumptions that allow the improved operation of the navigation system 1 and also other systems in cooperation with the navigation system 1 in tracking the position of a radio signal source.

Applications of Improved Transmitter Tracking

There are many useful applications associated with transmitter tracking—especially associated with tracking resources having a radio signal source associated with them.

For example, one application would be the tracking of emergency vehicles such as police, ambulance and fire engines. Each of these vehicles would have a radio signal source having distinguishing characteristics that could be tracked and presented on a map. Therefore, when an incident requiring a response from one or more of such vehicles arises, an operator or automatic system could easily determine the appropriate resource closest to the incident and dispatch it accordingly.

Radio signal transmitters associated with resources of a particular type (e.g. either fire, ambulance or police) can be represented by an icon of a particular type.

It will be understood that the embodiments described above are given by way of example only and are not intended to limit the invention, the scope of which is defined in the appended claims. It will also be understood that the embodiments described may be used individually or in combination.

The invention claimed is:

1. A method of determining a position of a radio signal transmitter comprising;
   determining a type of radio signal being transmitted from the radio signal transmitter by analyzing the radio signal for radio signal characteristics; and
   correlating different sets of information in a way dependent on the determined radio signal type in order to determine the position of the radio signal transmitter;
   wherein each set of information corresponds to a different relative position of at least one receiver to the transmitter, each set of information comprising:
   radio signal data derived from radio signals received by the at least one receiver from the transmitter at each respective relative position; and
   positioning data containing information about a position of the at least one receiver at each respective relative position,
   wherein the method further comprises:
   assessing dynamics of a platform on which the radio signal transmitter is supported, and correlating the different sets of information in a way dependent on the determined dynamics of the platform, and
   wherein determining the type of radio signal being transmitted from the radio signal transmitter comprises determining whether the type of radio signal originates from a movable radio signal source or a stationary, immovable radio signal source, and when the type of radio signal originates from a movable radio signal source, repeating the correlating of different sets of information to track the mobile radio signal source.

2. A method according to claim 1 wherein determining whether the type of radio signal originates from a mobile radio signal source or a stationary radio signal source includes:
   analyzing the radio signal characteristics of the radio signal,
   consulting a database, and
   inferring the type of radio signal source.

3. A method according to claim 1, wherein a plurality of receivers are arranged to be in communication with one another so that they can share the different sets of information.

4. A method according to claim 1, wherein at least one of the sets of information comprises:
   radio signal time of flight values/ranges.

5. A method according to claim 1, wherein at least one of the sets of information comprises:
   radio signal strength values/ranges.

6. A method according to claim 1, wherein at least one of the sets of information comprises:
   radio signal arrival angle values/ranges.

7. A method according to claim 1, comprising:
   querying a database to determine how to correlate the different sets of information, the database having a set of rules mapping different sets of radio signal characteristics to different ways of correlating the sets of information.

8. A method according to claim 7, comprising:
   updating the database by at least one of downloading additional rules and receiving user input.

9. A method according to claim 1, further comprising:
   presenting a user interface to receive information about at least one of mobility of the radio signal transmitter, a bearing value/range of the radio signal transmitter relative to a given receiver, an estimated position value/range of the radio signal transmitter, and an estimated type of the radio signal transmitter.

10. A method according to claim 1, comprising:
    presenting a user interface to display information about the radio signal transmitter, the displayed information including a map on which a representation of the radio signal transmitter is imposed, the representation including an error ellipse, a size and shape of which are representative of an error associated with estimated position of the radio transmitter.

11. A method according to claim 1, wherein the correlating of data comprises:
applying a Bayesian estimation filter.

12. A method according to claim 11, wherein application of the Bayesian estimation filter comprises:
loading the filter with a model associated with the determined type of radio signal transmitter.

13. A method according to claim 1, comprising:
estimating the position of a radio signal receiver by:
estimating a position of a first stationary radio signal transmitter using a primary set of positioning resources available to the receiver;
adding the position of the first transmitter to a secondary set of positioning resources available to the receiver; and
using the secondary set of positioning resources to estimate the position of the receiver.

14. An apparatus for determining a position of a radio signal transmitter, comprising:
means for determining a type of radio signal being transmitted from the radio signal transmitter by analyzing the radio signal for radio signal characteristics, and for correlating different sets of information in a way dependent on the determined radio signal type in order to determine a position of the radio signal transmitter, wherein each set of information corresponds to a different relative position of at least one receiver to the transmitter, each set of information including radio signal data derived from radio signals received by the at least one receiver from the transmitter at each respective relative position, and positioning data containing information about a position of the at least one receiver at each respective relative position; and
means for assessing dynamics of a platform on which the radio signal transmitter is supported, and for correlating the different sets of information in a way dependent on the dynamics of the platform, wherein said means for assessing includes means for determining according to the type of radio signal whether the platform is a movable platform or a stationary, immovable platform.

15. An apparatus comprising non-transient media on which is stored computer readable code that, when loaded onto a computer, causes it to perform a method of determining a position of a radio signal transmitter, the method including:
determining a type of radio signal being transmitted from the radio signal transmitter by analyzing the radio signal for radio signal characteristics; and
correlating different sets of information in a way dependent on the determined radio signal type in order to determine the position of the radio signal transmitter;
wherein each set of information corresponds to a different relative position of at least one receiver to the transmitter, each set of information comprising:
radio signal data derived from radio signals received by the at least one receiver from the transmitter at each respective relative position: and
positioning data containing information about a position of the at least one receiver at each respective relative position, wherein the method further comprises:
assessing dynamics of a platform on which the radio signal transmitter is supported, and correlating the different sets of information in a way dependent on the dynamics of the platform, wherein said assessing includes determining according to the type of radio signal whether the platform is a movable platform or a stationary, immovable platform.

16. The method of claim 11, wherein the Bayesian estimation filter includes at least one of a Kalman filter and a particle filter.

* * * * *